Feb. 6, 1962 F. J. HOGUE 3,020,453
UNITIZED ELECTRICAL CAPACITOR
Filed May 22, 1959 2 Sheets-Sheet 1
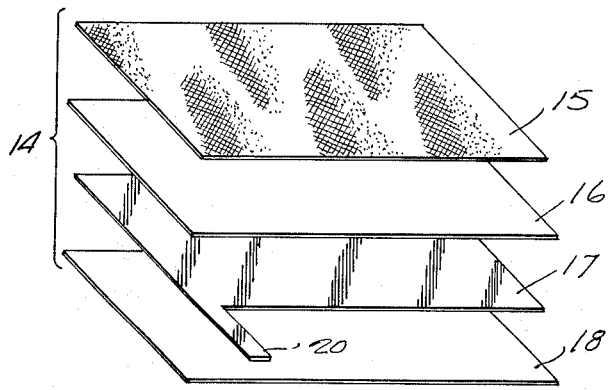
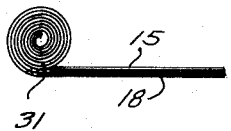
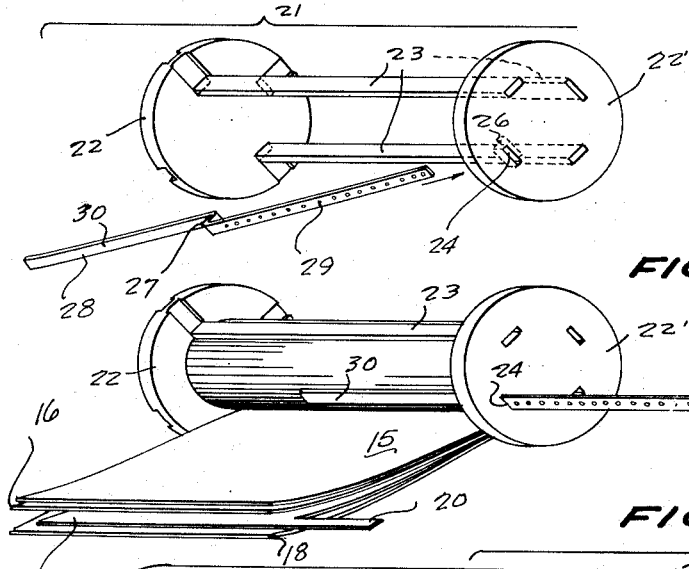
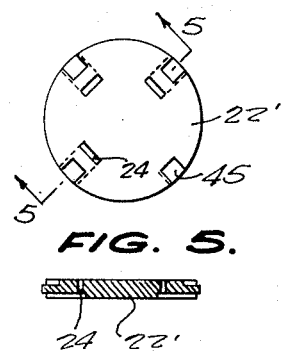
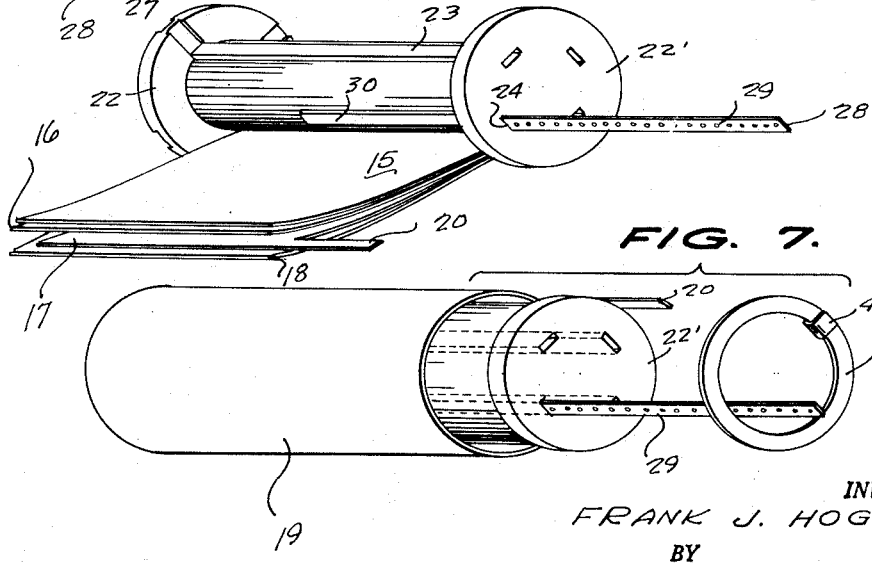
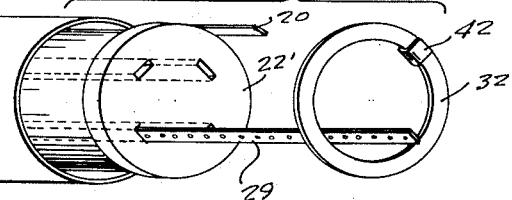
INVENTOR.
FRANK J. HOGUE,
BY
McMorrow, Berman & Davidson
ATTORNEYS.

Feb. 6, 1962 F. J. HOGUE 3,020,453
UNITIZED ELECTRICAL CAPACITOR
Filed May 22, 1959 2 Sheets-Sheet 2
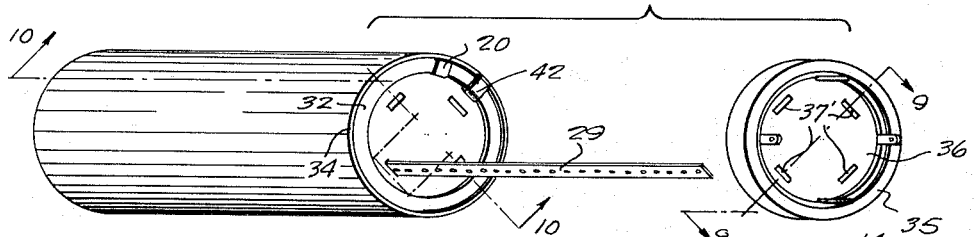
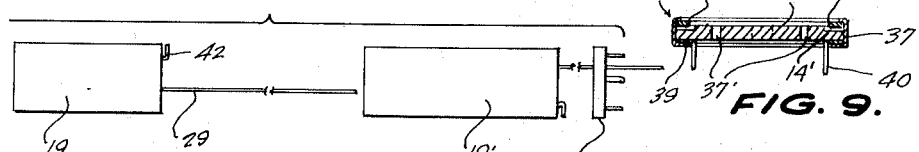
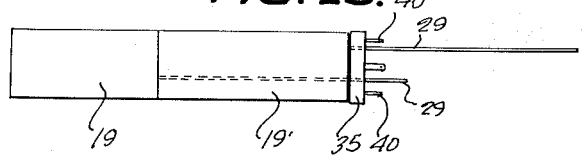
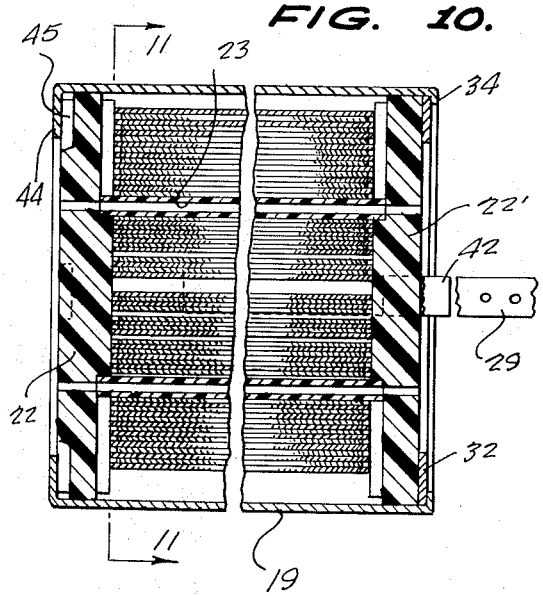
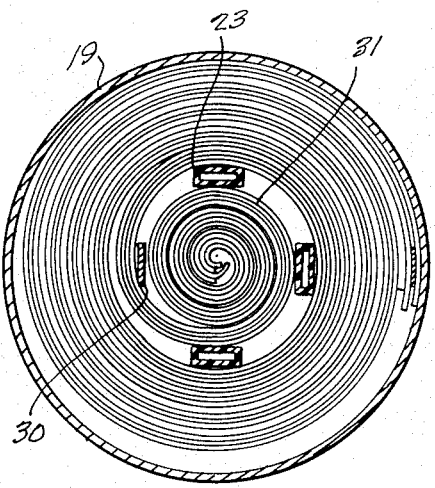
INVENTOR.
FRANK J. HOGUE,
BY
McMorrow, Berman & Davidson
ATTORNEYS.

United States Patent Office 3,020,453
Patented Feb. 6, 1962

3,020,453
UNITIZED ELECTRICAL CAPACITOR
Frank J. Hogue, 129 N. 15th St., Malvern, Ohio
Filed May 22, 1959, Ser. No. 815,145
4 Claims. (Cl. 317—230)

This invention relates to electrical condensers, and more particularly to a unitized condenser which can be manufactured as a single, a dual, a triple or a quadruple section capacitor.

A main oject of the invention is to provide a novel and improved capacitor which is simple in construction, which is easy to assemble, and which is arranged so that several individual sections may be stacked in axially aligned relationship to define a multiple-section capacitor wherein electrical connections to the respective sections of the capacitor may be made at the end of the stacked unit.

A further object of the invention is to provide an improved multiple-section electrical condenser which is inexpensive to fabricate, which is compact in size, and which may be manufactured as a single, a double, a triple or a quadruple unit without requiring special modifications of the component elements thereof.

A still further object of the invention is to provide an improved multiple-section capacitor which is durable in construction, which is economical to manufacture, and which is reliable in performance.

Further objects and advantages of the invention will become apparent from the following description and claims, and from the accompanying drawings, wherein:

FIGURE 1 is a perspective view of the sheet-like elements employed to form the capacitor assembly of one of the sections of an improved condenser constructed in accordance with the present invention.

FIGURE 2 is a fragmentary end elevational view showing the manner in which the sheet-like elements of FIGURE 1 are spirally wound to form the preliminary foil assembly employed in making a capacitor section according to the present invention.

FIGURE 3 is a perspective view of a core member and a terminal strip, as employed in one of the capacitor sections of the present invention.

FIGURE 4 is an elevational view of one of the disc elements employed in the core member of FIGURE 3.

FIGURE 5 is a cross sectional view taken on the line 5—5 of FIGURE 4.

FIGURE 6 is a perspective view of the core member of FIGURE 3 with the partially coiled foil elements of FIGURE 2 and the terminal strip inserted within the core member.

FIGURE 7 is a perspective view showing the completed core and foil member assembly received in the metallic case of the capacitor section, preliminary to completion of the assembly of each section.

FIGURE 8 is a perspective view showing the elements of FIGURE 7 in assembled relationship, ready to receive the base cap of the assembly.

FIGURE 9 is a cross sectional view taken on the line 9—9 of FIGURE 8.

FIGURE 10 is a fragmentary enlarged cross sectional view taken on the line 10—10 of FIGURE 8.

FIGURE 11 is a transverse vertical cross sectional view taken on the line 11—11 of FIGURE 10.

FIGURE 12 is an elevational view illustrating the manner in which a pair of capacitor sections are disposed in axially aligned relationship for stacking the sections together.

FIGURE 13 is an elevational view showing the capacitor sections of FIGURE 12 stacked together, preparatory to finally locking them in axially aligned relationship.

Referring to the drawings, 14 generally designates a coil assembly which may be employed to provide the electrical elements of a condenser section according to the present invention. The assembly 14 comprises the respective layers 15, 16, 17 and 18. The layers 15 and 17 comprise tinfoil, and the layers 16 and 18 comprise paper soaked in a suitable dielectric composition, so that when the layers 15, 16, 17 and 18 are superimposed and rolled up in the manner shown in FIGURE 2, they define an electrical condenser.

The foil element 17 is adapted to be electrically connected to a tubular metallic case 19, as will be presently described, and for this purpose is provided with a tab element 20 integrally formed at one corner thereof, as is clearly shown in FIGURE 1.

Designated generally at 21 is a core member which comprises a pair of circular disc members 22, 22' of insulating material which are rigidly connected by three tubular rod elements 23, also of insulating material, to define conduits through the core member, for a purpose presently to be described. The tubular rod elements 23 are located at a common radial distance from the axis of the core assembly and are spaced apart by 90° angles, as shown. The disc member 22' at one end of the core member is formed with a slot 24 located at the same radial distance from the axis of the core assembly as the tubular rod elements 23 and angularly spaced 90° from the nearest rod members 23, as is clearly shown in FIGURE 3.

The disc member 22' is formed on its inside surface adjacent the slot 24 with a recess 26 adapted to receive the offset portion 27 of a metal terminal strip 28, the terminal strip having an apertured end portion 29 which is engageable through the slot 24, and through similar slots provided on additional capacitor sections, when a stacked capacitor is to be formed, as will be presently described. The remaining portion of the terminal strip, namely the portion 30 shown in FIGURE 3, is adapted to be conductively engaged against an intermediate portion of the foil element 15 so as to make electrical contact therewith.

In assembling the initial capacitor section, the sheetlike members 15, 16, 17 and 18 are first spirally wrapped to define a preliminary spiral portion 31, as shown in FIGURE 2, of sufficient diameter to be snugly received within the space defined by the three tubular insulating rod elements 23 of the core member 21. The spirally wrapped portion 31 is then engaged in this space and the terminal strip 28 is placed thereagainst with the portion 30 engaging the exposed surface of the foil element 15. The apertured portion 29 is engaged through the slot 24, as previously described, with the offset portion 27 received in the recess 26. The sheet-like elements 15, 16, 17 and 18 are then further wrapped to define a completed spiral, as shown in FIGURE 7, the completed assembly including the sheet-like elements 15 to 18 and the core 21, being then slipped into a tubular metallic case 19, previously mentioned. As shown in FIGURE 7, the tab 20 then projects axially past the peripheral edge of the circular core disc 22', and the apertured portion 29 of the terminal strip likewise projects axially from the end of the core.

Designated at 32 is a substantially flat circular metal ring which is engageable against the disc 22', the tab element 20 being conductively engaged with the ring, as by being wrapped therearound, and the ring being then secured to the rim portion of the case 19 by crimping said rim portion inwardly, as shown at 34.

If the unit is to be a single section condenser, a base cap 35 is then fastened thereon. The base cap 35 comprises a circular main body portion 36 of insulating material formed with the four equally spaced slots 37' at the same radial distance from the axis thereof as the rod member 23, and being therefore registrable with the open ends of said rod members, as well as with the slot 24. An annular metal rim 37 is secured on the disc member 36, respective flat ring elements 38 and 39 being fastened in the inwardly flanged rim portions of the ring 37, as shown in FIGURE 9. The bottom ring 39 is formed with the outwardly projecting apertured ground lugs 40. The top surface of the member 36 is formed subjacent the ring 38 with recesses 14' in which a locking lug 42 on ring 32 is adapted to be engaged. Thus, the lug 42 is disposed diametrically opposite the apertured end 29 of the terminal strip 28, and the lug 42, which is integrally formed on the ring 32 extends from the inner edge of the rings 32 and is directed outwardly, as shown in FIGURE 8. The recesses 14' are substantially on the same radii as the slots 37'. In mounting the base cap 35, the apertured end portion 29 of the terminal strip is engaged through a slot 37' and the end cap is then tilted relative to the case 19 to engage the lug 42 beneath the ring 38 and in a recess 14' opposite the member 29. With the lug 42 hooked in the selected recess 14', the end cap may then be pushed into abutting engagement with the end of the case 19, after which the end portion 29 of the terminal strip may be twisted to lock the base member 35 to the case, and the surplus amount of member 29 not needed for electrical connections may be clipped off.

As will be readily apparent, when the assembly is completed, the tab 20 is in conductive engagement with the case 19 and with the ring 35 so that the lugs 40 are electrically connected to the foil element 17. The member 29 serves as the terminal for making an electrical connection to the foil element 15.

As shown in FIGURE 10, the case 19 is crimped inwardly at the end thereof opposite the rim flange 34, as shown at 44, and the disc 22 is formed with recesses 45 similar to the recesses 14', to define locking recesses adjacent the rim flange 44. Thus, a pair of adjacent sections may be locked together by hooking the locking lug 42 of the end section around the flange 44 and into locking engagement in a recess 45 of the next adjacent section having the case 19', as shown in FIGURE 12. The outwardly extending terminal strip portion 29 of the first section is engaged through a tubular rod element 23 of the second capacitor section, so that the terminal strip portion 29 projects outwardly from the end of the final section and is receivable through a slot 37' of the end cap 35, as shown in FIGURE 13. The end cap 35 is lockingly engaged on the terminal end of the final section in the manner above described.

Since the tubular rod elements 23 are spaced so as to be registrable with the terminal strips of respective capacitor sections to be stacked, as many as four sections may be stacked together in the manner above described, with the exposed end portions of their terminal strip elements 29 available for making electrical connections to the respective foil members 15 of the sections.

As above mentioned the protruding end portions of the terminal strip members 29 may be twisted to lock the end cap 35 on the final section in the manner previously described, and the surplus amounts of the terminal strip elements 29, not needed for electrical connections thereto, may be clipped off.

While a specific embodiment of an improved capacitor has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A multiple section condenser comprising a plurality of condenser sections, each section comprising a tubular metallic case, an insulating core member disposed in said case, a pair of insulated sheet-like foil elements spirally wound on said core member, a tab element formed integrally on the edge of one of said foil elements, and means electrically connecting said tab element to the case, means securing the sections in end-to-end axially aligned relation with their cases in conductive contact with each other, and respective elongated conductive terminal strips conductively engaged with the other foil elements of the sections and extending through the sections parallel to the common axis of the sections, said terminal strips projecting from the final section, the core members of the sections including axially extending tubular insulating sleeves spaced to receive said elongated terminal strips and insulating disc members connecting the ends of the sleeves.

2. A multiple section condenser comprising a plurality of condenser sections, each section comprising a tubular metallic case, a pair of insulating circular disc members, a plurality of spaced tubular insulating rod elements connecting the disc members, a pair of insulated sheet-like foil elements wound to define a spiral, the inner portion of the spiral being received inwardly of the rod elements and the remainder of the spiral being disposed outwardly of and surrounding said rod elements, said disc members, rod elements and foil elements being received in said case, a tab element formed integrally on the edge of one of said foil elements, and means electrically connecting said tab element to the case, means securing the sections in end-to-end axially aligned relation with their cases in conductive contact with each other, and respective elongated conductive terminal strips conductively engaged with the other foil elements of the sections and extending through the sections parallel to the common axis of the sections, said terminal discs projecting from the final section, said tubular rod elements being spaced to receive said elongated terminal strips.

3. A multiple section condenser comprising a plurality of condenser sections, each section comprising a tubular metallic case, a pair of insulating circular disc members, a pair of spaced tubular insulating rod elements connecting the disc members, a pair of insulated sheet-like foil elements wound to define a spiral, the inner portion of the spiral being received inwardly of the rod elements and the remainder of the spiral being disposed outwardly of and surrounding said rod elements, said disc members, rod elements, and foil elements being received inside the case, a tab element formed integrally on the edge of one of the foil elements adjacent one of the disc members, a metallic connection ring engaged against said one of the disc members and being in conductive contact with the case, said tab element being also in conductive contact with said ring, whereby said tab element is electrically connected to the case, means securing the sections in end-to-end axially aligned relation with their cases in conductive contact with each other, and respective elongated conductive terminal strips conductively engaged with the other foil elements of the sections and extending through the sections parallel to the common axis of the sections, said terminal strips projecting from the final section, said tubular rod elements being spaced to receive said elongated terminal strips.

4. A multiple section condenser comprising a plurality of condenser sections, each section comprising a tubular metallic case, a pair of insulating circular disc members, a plurality of spaced tubular insulating rod elements connecting the disc members, a pair of insulated sheet-like foil elements wound to define a spiral, the inner portion of the spiral being received inwardly of the rod elements and the remainder of the spiral being disposed outwardly of and surrounding said rod elements, said disc members, rod elements and foil elements being received within the case, a tab element formed integrally on the edge of one of the foil elements adjacent one of the disc members, a metallic connection ring engaged against said one of the disc members and being in conductive contact with the case, said tab element being also in conductive contact with the ring, whereby said tab element is electrically connected to the case, means securing the sections in end-to-end axially aligned relation with their cases in conductive contact with each other, respective elongated conductive terminal strips conductively engaged with the other foil elements of the sections and extending through the sections parallel to the common axis of the sections, said terminal strips projecting from the final section, said tubular rod elements being spaced to receive said elongated terminal strips, and an insulating cover disc secured to the end of the case of the final section adjacent the connection ring thereof, said cover disc being formed with apertures registrable with the ends of said tubular rod elements to receive the elongated terminal strips therethrough.

References Cited in the file of this patent

UNITED STATES PATENTS

| | | |
|---|---|---|
| 239,370 | De Forest | Mar. 29, 1881 |
| 1,190,886 | Giles | July 11, 1916 |
| 1,861,006 | Goodman | May 31, 1932 |
| 1,868,120 | Sievert | July 19, 1932 |
| 1,898,789 | Ringwald | Feb. 21, 1933 |

FOREIGN PATENTS

| | | |
|---|---|---|
| 139,694 | Great Britain | Mar. 11, 1920 |
| 379,073 | Great Britain | Aug. 25, 1932 |
| 162,630 | Australia | July 1, 1954 |
| 736,487 | Great Britain | Sept. 7, 1955 |

UNITED STATES PATENT OFFICE

CERTIFICATE OF CORRECTION

Patent No. 3,020,453                       February 6, 1962

Frank J. Hogue

It is hereby certified that error appears in the above numbered patent requiring correction and that the said Letters Patent should read as corrected below.

In the grant, line 3, and in the heading to the printed specification, line 3, for "Malvern, Ohio", each occurrence, read -- Sebring, Ohio --.

Signed and sealed this 19th day of June 1962.

(SEAL)
Attest:

ERNEST W. SWIDER
Attesting Officer

DAVID L. LADD
Commissioner of Patents